(12) United States Patent
Dunlap et al.

(10) Patent No.: US 7,753,400 B2
(45) Date of Patent: Jul. 13, 2010

(54) MULTI-AXLE LEAF SPRING SUSPENSION WITH COMPLIANT EQUALIZER

(75) Inventors: William Dunlap, Elkhart, IN (US);
James C. Tuthill, Elkhart, IN (US);
Terry L. Trindle, Elkhart, IN (US)

(73) Assignee: Dexter Axle Company, Elkhart, IN (US)

( * ) Notice: Subject to any disclaimer, the term of this patent is extended or adjusted under 35 U.S.C. 154(b) by 167 days.

(21) Appl. No.: 11/230,768

(22) Filed: Sep. 20, 2005

(65) Prior Publication Data
US 2007/0063488 A1    Mar. 22, 2007

(51) Int. Cl.
*B60G 5/00* (2006.01)
(52) U.S. Cl. ..................................... 280/682
(58) Field of Classification Search ................. 280/682, 280/676
See application file for complete search history.

(56) References Cited

U.S. PATENT DOCUMENTS

| | | | | |
|---|---|---|---|---|
| 2,269,728 A | * | 1/1942 | Mills | 280/81.6 |
| 2,639,166 A | * | 5/1953 | Jones | 280/682 |
| 2,719,728 A | | 10/1955 | Boyles | 280/104.5 |
| 2,795,434 A | | 6/1957 | Gouirand | 280/104.5 |
| 2,869,889 A | | 1/1959 | Dickison | 280/104.5 |
| 2,957,058 A | * | 10/1960 | Trott | 200/61.22 |
| 3,121,574 A | * | 2/1964 | Hockensmith, Jr. | 280/682 |
| 3,166,341 A | * | 1/1965 | Flowers | 280/682 |
| 3,199,892 A | * | 8/1965 | Boys | 280/683 |
| 3,361,442 A | * | 1/1968 | Willetts | 280/682 |
| 3,504,929 A | * | 4/1970 | King | 280/682 |
| 3,833,236 A | * | 9/1974 | Davis et al. | 280/676 |
| 3,856,325 A | | 12/1974 | Willetts | 280/124 R |
| 3,929,347 A | * | 12/1975 | Masser | 280/676 |
| 4,033,606 A | * | 7/1977 | Ward et al. | 280/682 |
| 4,193,612 A | | 3/1980 | Masser | 280/681 |
| 4,200,267 A | * | 4/1980 | King | 267/52 |
| 4,502,707 A | * | 3/1985 | Jable et al. | 280/682 |
| 4,505,459 A | | 3/1985 | Goth et al. | 267/46 |
| 4,763,921 A | | 8/1988 | Steiner | 280/682 |
| 4,824,138 A | * | 4/1989 | Rappold | 280/682 |
| 5,186,485 A | | 2/1993 | Orr et al. | 280/678 |

(Continued)

FOREIGN PATENT DOCUMENTS

EP    0114992    8/1984

(Continued)

*Primary Examiner*—Paul N Dickson
*Assistant Examiner*—Timothy D Wilhelm
(74) *Attorney, Agent, or Firm*—J. A. Thurnau, Esq.; J. L. Mahurin, Esq.; P. N. Dunlap, Esq.

(57) ABSTRACT

A multi-axle leaf spring suspension having a compliant equalizer. The leaf springs are mounted one behind the other on each side of the vehicle. Adjacent ends of the leaf springs are pivotally attached to the compliant equalizer. The compliant equalizer is pivotally mounted to a vehicle frame. The compliant equalizer comprises a pair of arms that are pivotally connected to each other in a scissor-like fashion. One end of each arm is pivotally connected to the end of a leaf spring. The other end of each arm is cooperatively arranged to contain and compress a spring member between them. The compliant equalizer reduces the magnitude of shocks that would be other wise transmitted to the suspension and frame by absorbing them through compression of the spring member.

3 Claims, 4 Drawing Sheets

U.S. PATENT DOCUMENTS

| | | | | |
|---|---|---|---|---|
| 6,382,659 B1 | 5/2002 | Simard | ........................ | 280/686 |
| 6,478,321 B1* | 11/2002 | Heitzmann | ............ | 280/124.177 |
| 6,604,756 B2* | 8/2003 | Simard et al. | ................ | 280/676 |
| 6,679,517 B2* | 1/2004 | Proia | ........................... | 280/682 |
| 7,144,031 B2* | 12/2006 | Fenton | ........................ | 280/682 |

FOREIGN PATENT DOCUMENTS

| | | |
|---|---|---|
| EP | 0149262 | 7/1985 |
| GB | 1591914 | 7/1981 |
| WO | 2004/037568 A2 | 6/2004 |

* cited by examiner

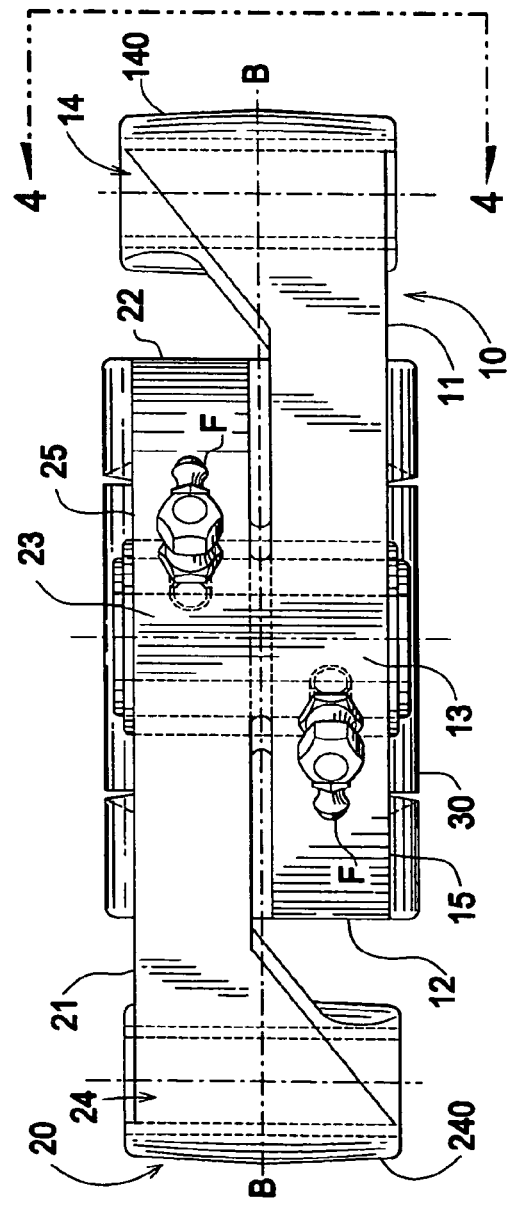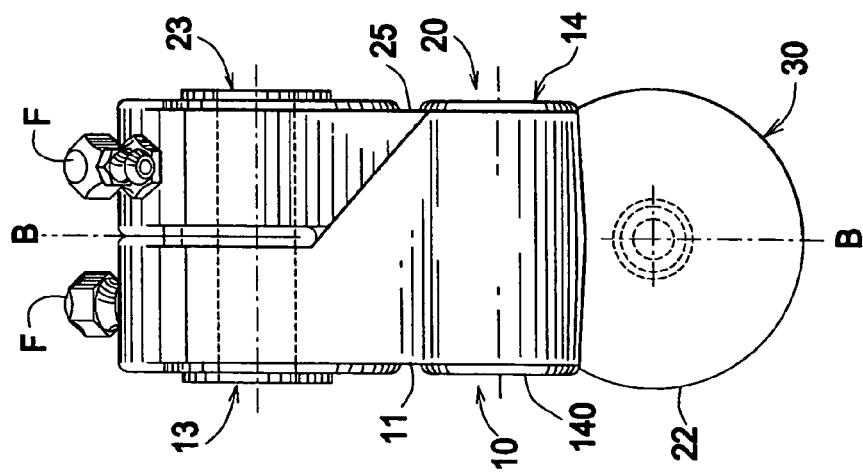

MULTI-AXLE LEAF SPRING SUSPENSION WITH COMPLIANT EQUALIZER

FIELD OF THE INVENTION

The invention relates to multi-axle suspension systems, and more particularly to a multi-axle leaf spring suspension system having a compliant equalizer.

BACKGROUND OF THE INVENTION

Conventional multi-axle assemblies for trucks or trailers may comprise two or more axles. In the case of a two axle arrangement, four leaf springs are used. Two leaf springs are on each side of the frame. The remote ends of each pair of springs are usually supported within hanger brackets which are secured to the frame. The adjacent ends of each pair of springs are supported by a pivotally mounted equalizer. The equalizers are in turn supported by hanger brackets which are secured to the frame.

When the front wheels in the tandem suspension, for example, encounter a condition in the road producing a vertical movement of the front axle, the resultant deflection in the front springs is transmitted in part by the equalizer to the rear springs. This results in an equalizing effect in which any vertical displacement of either axle is distributed between the springs which minimizes the weight differential between the axles.

In the instance of a vehicle equipped with a prior art equalization tandem one problem concerns inadequate and abrupt load equalization from one axle to another. As one end of the equalizer rotates upwardly at the point at which the spring end contacts the leaf spring, the other end abruptly rotates downward. This action causes abrupt and unequal moments about the center pivot point of the equalizer; inequality increases as the range of equalizer movement increases.

The end results of improper load equalization are numerous. If the axle which encounters bumps and overloads is unpowered, a loss of traction can occur on the powered axle. The suspension components, and springs in particular, are subjected to higher stresses and therefore their service life is shortened appreciably. As the leaf springs are subjected to overload they progressively lose capacity to absorb energy and therefore transmit more energy through the mounting brackets to the vehicle frame. Increased input of energy into the vehicle frame can often contribute at given loads, speeds and highway conditions to damage to the vehicle. Further, wherever an unequal load distribution occurs within a tandem suspension, the axle which is overloaded transmits its load to the roadway in a manner that can be detrimental to the roadway. The foregoing arguments also apply to suspensions comprising more than two axles.

Representative of the art is U.S. Pat. No. 4,033,606 to Ward (1977) which discloses an equalized suspension system is provided for the truck of a truck-trailer combination of the tandem axle type. The suspension on each side of the vehicle includes independent semi-elliptic leaf springs mounted in tandem relationship one behind the other, and which are respectively connected at their midpoint to the forward and rearward axles. The remote ends of each spring are supported in rolling contact with respective roller assemblies housed by respective brackets which, in turn, are secured to the frame of the truck. An equalizer support bracket is provided between the adjacent ends of each pair of springs and an equalizer is pivotally supported within each equalizer support bracket. The adjacent ends of the springs are pivotally attached to shackles which, in turn, are pivotally mounted to the respective equalizers.

What is needed is a multi-axle leaf spring suspension system having a compliant equalizer. The present invention meets this need.

SUMMARY OF THE INVENTION

The primary aspect of the invention is to provide a multi-axle leaf spring suspension system having a compliant equalizer.

Other aspects of the invention will be pointed out or made obvious by the following description of the invention and the accompanying drawings.

The invention comprises a multi-axle leaf spring suspension having a compliant equalizer. The leaf springs are mounted one behind the other on each side of the vehicle. Adjacent ends of the leaf springs are pivotally attached to the compliant equalizer. The compliant equalizer is pivotally mounted to a vehicle frame. The compliant equalizer comprises a pair of arms that are pivotally connected to each other in a scissor-like fashion. One end of each arm is pivotally connected to the end of a leaf spring. The other end of each arm is cooperatively arranged to contain and compress a spring member between them. The compliant equalizer reduces the magnitude of shocks that would be other wise transmitted to the suspension and frame by absorbing them through compression of the spring member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a top view of the inventive equalizer.
FIG. 4 is an end view of the inventive equalizer.

DETAILED DESCRIPTION OF THE PREFERRED EMBODIMENT

Figure 1:
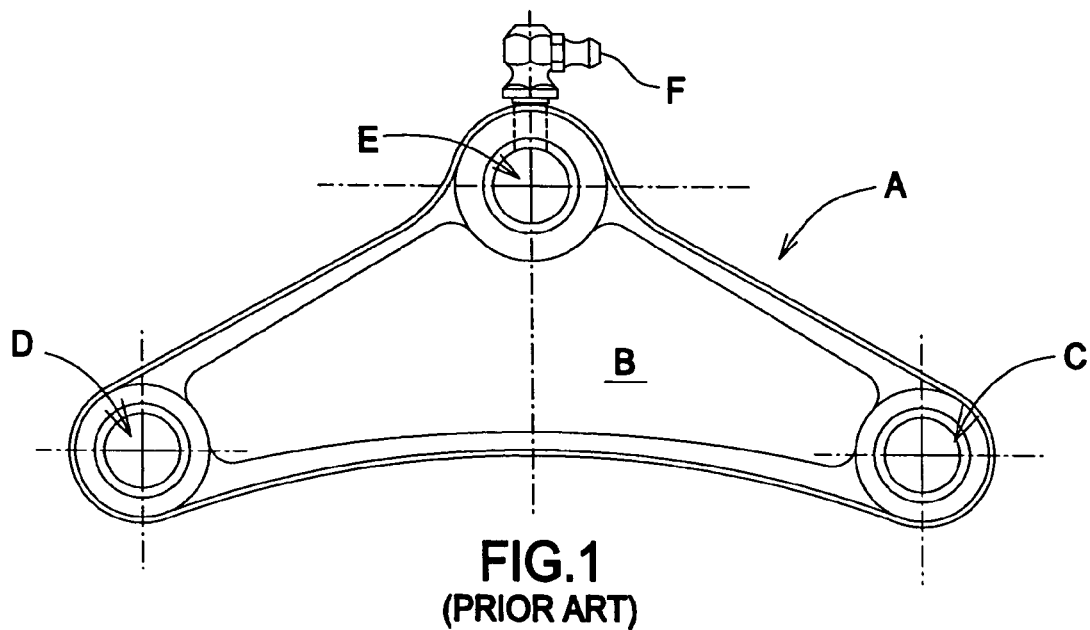
FIG. 1 is a side view of a prior art equalizer.

FIG. 1 is a side view of a prior art equalizer. Equalizer (A) comprises a frame (B). Leaf springs (not shown) are pivotally connected to the equalizer by a shaft (not shown) that engages hole (C) and by a shaft (not shown) that engages hole (D), each in a manner known in the art. The equalizer can be pivotally connected to a vehicle frame bracket by a shaft or pin (not shown) that engages frame (B) at hole (E). Equalizer (A) pivots about the shaft in hole (E) as the equalizer absorbs movement in the suspension. Grease zerk (F) may be used to lubricate the joint if necessary.

Figure 2:
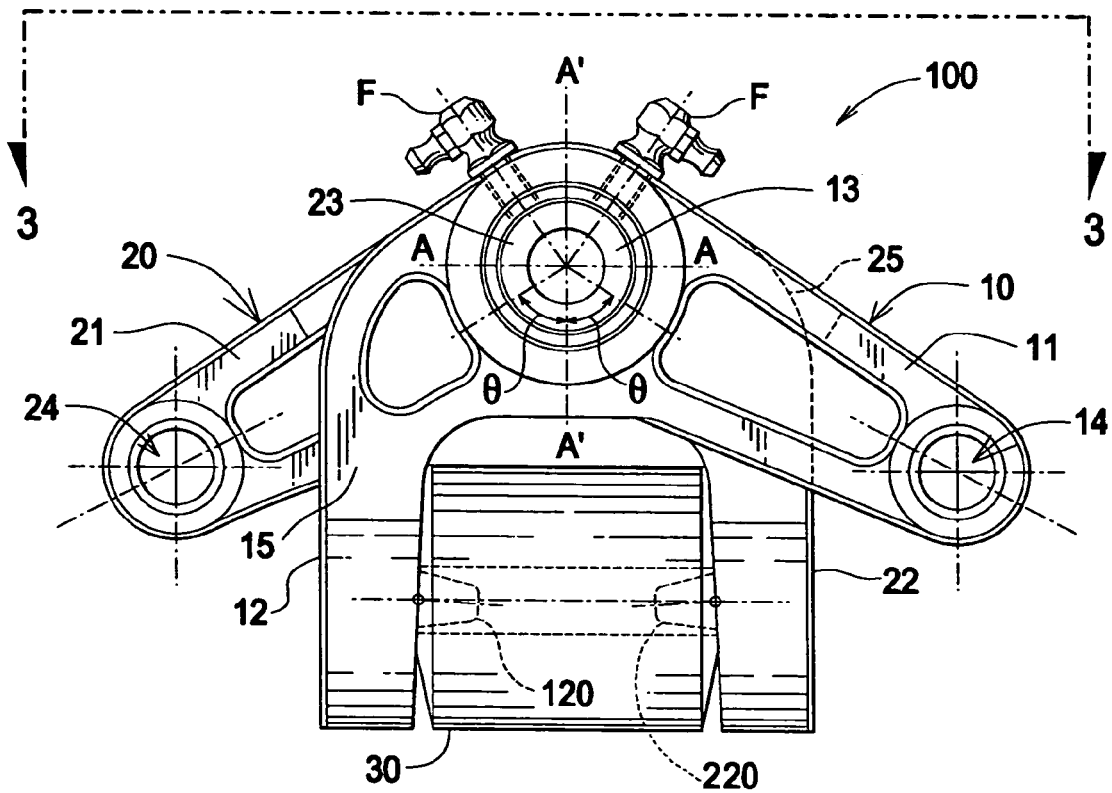
FIG. 2 is a side view of the inventive equalizer.

FIG. 2 is a side view of the inventive equalizer. The inventive equalizer comprises arm portions 10, 20. Arm portion 10 comprises an arm 11 and arm 12. Arm 11 and arm 12 extend substantially radially from pivot portion 13. Arm 11 and arm 12 describe an angle ($\theta$) between them which angle is centered with respect to pivot portion (13).

Arm portion 20 comprises an arm 21 and arm 22. Arm 21 and arm 22 extend substantially radially from pivot portion 23. Arm 21 and arm 22 describe an angle ($\theta$) between them which angle is centered with respect to pivot portion (13).

Angle (θ) is in the range of approximately 10° to approximately 170°. In the preferred embodiment angle θ is in the range of approximately 30° to approximately 60°.

Arm portions 10 and 20 pivot with respect to each other in a scissor-like fashion on a common pivot. The common pivot comprises pivot portion 13 and pivot portion 23. Pivot portion 13 and pivot portion 23 each pivotally engage shaft 130 when installed in a suspension, see FIG. 6.

A spring member 30 is disposed between arms 12 and 22. Arms 12 and 22 are aligned with each other in order to capture and contain the spring member 30 which is compressively disposed between them. Protrusions 120 and 220 comprise means to retain spring member 30 between arm 12 and arm 22 in order to prevent lateral movement of spring member 30 during operation of the suspension and equalizer. In normal operation spring member 30 is in compression between arm 12 and arm 22.

Spring member 30 absorbs load inputs to the equalizer as the suspension operates. Spring member 30 provides an additional compliant element in the overall suspension system. Hence, in addition to the leaf springs in a tandem axle system, spring member 30 provides another component having a spring rate that can be used to tune the suspension for a better ride.

Spring member 30 may comprise natural or synthetic rubber or other polymeric material. Spring member 30 may also comprise a torsion spring or any other spring which is suitable for the service.

Figure 6:
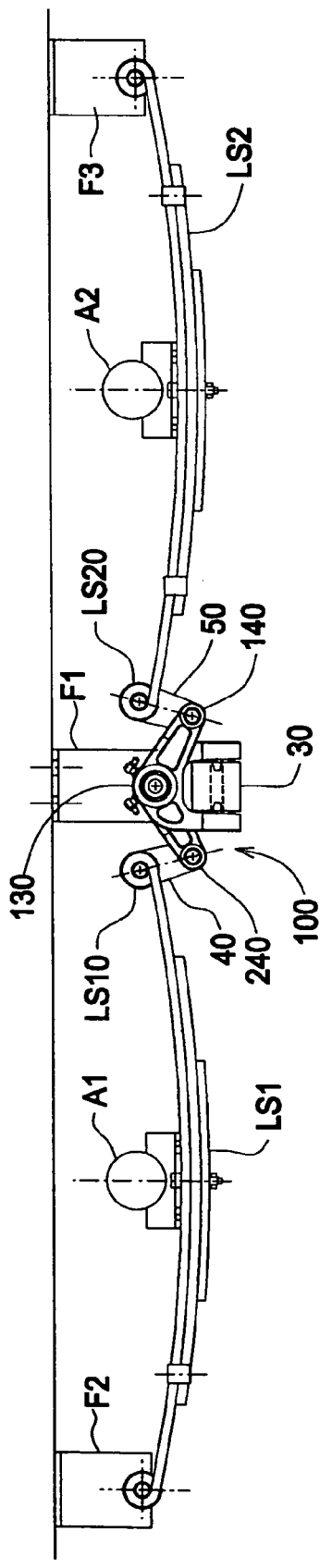
FIG. 6 is a side view of an inventive suspension.

An end of each connector (40, 50), see FIG. 6, pivotally connects through holes 24 and 14 respectively by way of a shaft that projects through each hole. The other end of each connector (40, 50) is connected to each leaf spring.

FIG. 3 is a top view of the inventive equalizer. Referring to axis B-B, portion 140 projects in an "L" shape across axis B-B to a position that is somewhat offset from arm 11. Portion 240 projects in an "L" shape across axis B-B to a position that is somewhat offset from arm 21. This arrangement makes the equalizer substantially symmetric about axis B-B which balances the forces experienced by the equalizer during operation, thereby negating any tendency that the equalizer would have to twist.

Spring member 30 is captured between arms 12, 22. Arm 22 projects in an "L" shape from arm portion 25 across axis B-B. Arm 12 projects in an "L" shape from arm portion 15 across axis B-B. Hence, when viewed in plan each portion 10, 20 "interlocks" with the other in a complementary fashion with respect to axis B-B in order to give the equalizer a symmetric form with respect to axis B-B. This arrangement minimizes the overall size and thickness of the inventive equalizer.

FIG. 4 is an end view of the inventive equalizer from 4-4 in FIG. 3. Arm portion 10 and arm portion 20 symmetrically cooperate about axis B-B. Arm 22 is shown as having a circular form in this view, but may have any shape suitable to accommodate the shape of spring member 30. Grease zerks (F) may be used to lubricate the joint.

Figure 5:
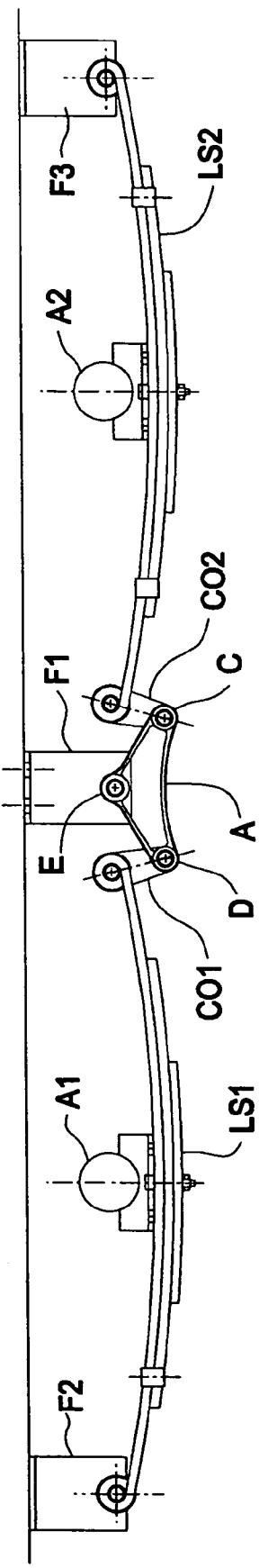
FIG. 5 is a side view of a prior art tandem suspension.

FIG. 5 is a side view of a prior art tandem suspension. Leaf spring LS1 is connected at one end to frame bracket F2 and at the other end to a connector CO1. CO1 is in turn connected to a shaft that is pivotally engaged through hole (D) in equalizer (A). Leaf spring LS2 is connected at one end to frame bracket F3 and at the other end to a connector CO2. CO2 is in turn connected to a shaft that is pivotally engaged through hole (C) in equalizer (A). Equalizer (A) is pivotally connected to frame bracket F1 by a shaft that is pivotally connected through hole (E). Frame brackets F1, F2, F3 are each connected to a vehicle frame (not shown) in a manner known in the art.

Axle A1 is connected to leaf spring LS1 in a manner known in the art. Axle A2 is connected to leaf spring LS2 in a manner known in the art. Either axle may be powered as part of a drive train (not shown).

The prior art system shown in FIG. 5 limits the pivot action of the equalizer (A) to a single rocking movement of the equalizer (A) about hole (E).

FIG. 6 is a side view of an inventive suspension. Equalizer 100 is pivotally connected to frame bracket F1 by shaft 130. It is understood that FIG. 6 shows one side of a vehicle suspension, a like arrangement being present on the other side of the vehicle.

Leaf spring end LS10 is pivotally connected to one end of connector 40. Another end of connector 40 is pivotally connected to hole 24 by shaft 240. Connector 40 displaces end LS10 some distance from hole 24 thereby creating a linkage having another degree of freedom of movement over the prior art for leaf spring LS1 and therefore for the suspension as well.

End LS20 is pivotally connected to one end of connector 50. Another end of connector 50 is pivotally connected to hole 14 by shaft 140. Connector 50 displaces end LS20 some distance from hole 14 thereby creating a linkage having another degree of freedom of movement over the prior art for leaf spring LS2 and therefore for the suspension as well.

As a vehicle travels on a road the suspension absorbs movement of axles A1 and A2 by flexing of each of the leaf springs LS1 and LS2, as well as by the relative movement of arm portions 10 and 20 through compression and expansion of spring member 30. Further, equalizer 100 pivots about shaft 130 to absorb and transmit differential movement of the two axles. Spring member 30 acts as a shock absorber and also damps vibrations that may otherwise be transmitted to the vehicle frame though F1.

Since the compliant equalizer comprises two arm portions that pivot to a certain extent independently about the common pivot, the inventive suspension takes advantage of two pivot arms (10, 20) (were there is only one in the prior art equalizer (A)) that are connected through the spring member 30. Hence, in the inventive suspension the end of each leaf spring (LS10, LS20) moves somewhat independently of the other since each is only connected to a single arm portion (10, 20), thereby increasing the available range of movement of the suspension. However, equalizing loads are still transmitted through the equalizer, just in a less damaging manner by virtue of the compliant spring member.

Figure 7:
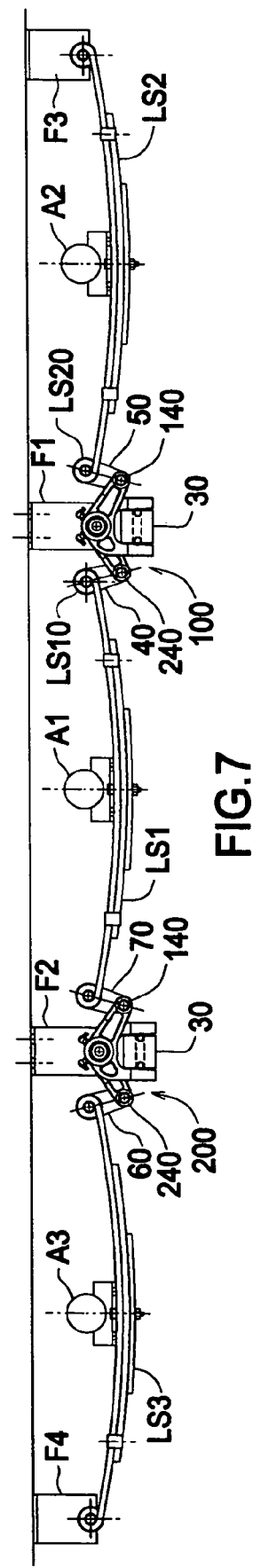
FIG. 7 is a side view of an inventive suspension.

FIG. 7 is a side view of an inventive suspension. In the case of a multi-axle suspension having more than two axles, the arrangement described herein is simply repeated for each additional axle, namely, another equalizer is disposed between each pair of leaf springs on each side of the vehicle as shown in FIG. 6. For example, in the case of a third axle A3 mounted on leaf spring LS3, another equalizer 200 is pivotally mounted on frame bracket F2. Leaf spring LS3 is connected at one end to connector 60 and thereby to equalizer 200, and at the other end to frame bracket F4. Instead of being connected to frame bracket F2 as in FIG. 6, an end of leaf spring LS1 is connected to connector 70 and thereby to equalizer 200. The suspension is otherwise as described in this specification.

Although forms of the invention have been described herein, it will be obvious to those skilled in the art that variations may be made in the construction and relation of parts without departing from the spirit and scope of the invention described herein.

We claim:

1. A multi-axle leaf spring suspension comprising:
a first leaf spring pivotally connected to a vehicle frame;
a second leaf spring pivotally connected to a vehicle frame;
an equalizer having a first arm portion and a second arm portion, the first arm portion and the second arm portion being pivotally moveable with respect to each other about a common pivot;
the first arm portion comprising arms that extend from a pivot portion and describe an angle ($\theta$) centered with respect to the pivot portion in the range of approximately 30° to approximately 60° between the arms;
the second arm portion comprising arms that extend from the pivot portion and describe an angle ($\theta$) centered with respect to the pivot portion in the range of approximately 30° to approximately 60° between the arms;
a polymeric spring member compressively disposed between the first arm portion and the second arm portion;
the first leaf spring pivotally connected through a moveable linkage to the first arm portion;
the second leaf spring pivotally connected through a moveable linkage to the second arm portion; and
the equalizer pivotally engaged with a vehicle frame at the common pivot.

2. The multi-axle leaf spring suspension as in claim 1 further comprising:
a third leaf spring pivotally connected to a vehicle frame;
a second equalizer having a second equalizer first arm portion and a second equalizer second arm portion, the second equalizer first arm portion and the second equalizer second arm portion being pivotally moveable with respect to each other;
a second polymeric spring member compressively disposed between the second equalizer first arm portion and the second equalizer second arm portion;
the second leaf spring pivotally connected through a moveable linkage to the second equalizer first arm portion;
the third leaf spring pivotally connected through a moveable linkage to the second equalizer second arm portion; and
the second equalizer pivotally engaged with the vehicle frame.

3. A complaint equalizer comprising:
a first arm portion comprising arms that extend from a pivot portion and describe an angle ($\theta$) centered with respect to the pivot portion in the range of approximately 30° to approximately 60° between the arms;
a second arm portion comprising arms that extend from the pivot portion and describe an angle ($\theta$) centered with respect to the pivot portion in the range of approximately 30° to approximately 60° between the arms;
the first arm portion and the second arm portion pivotally engaged in a scissor-like fashion;
a polymeric spring member compressed between the first arm portion and the second arm portion; and
means for retaining the spring member between the first arm portion and the second arm portion.

* * * * *